United States Patent
Jensen et al.

(10) Patent No.: US 7,288,196 B2
(45) Date of Patent: Oct. 30, 2007

(54) PLANT MATTER PACKAGING METHOD

(75) Inventors: Kyle R. Jensen, Apopka, FL (US); R. Glenn Brosch, Chuluota, FL (US); Roxanne M. Jensen, Apopka, FL (US)

(73) Assignee: Science Applications International Corporation, San Diego, CA (US)

(*) Notice: Subject to any disclaimer, the term of this patent is extended or adjusted under 35 U.S.C. 154(b) by 0 days.

(21) Appl. No.: 11/101,441

(22) Filed: Apr. 8, 2005

(65) Prior Publication Data

US 2005/0178723 A1 Aug. 18, 2005

Related U.S. Application Data

(60) Division of application No. 10/392,185, filed on Mar. 20, 2003, which is a continuation of application No. 10/243,935, filed on Sep. 16, 2002, now Pat. No. 6,554,960, which is a continuation of application No. 10/038,820, filed on Jan. 8, 2002, now Pat. No. 6,551,463, which is a continuation of application No. 09/378,987, filed on Aug. 23, 1999, now Pat. No. 6,350,350, which is a continuation-in-part of application No. 09/211,423, filed on Dec. 15, 1998, now Pat. No. 5,985,147, which is a continuation of application No. 08/831,736, filed on Apr. 1, 1997, now abandoned.

(51) Int. Cl.
*C02F 3/00* (2006.01)

(52) U.S. Cl. .................. 210/602; 206/584; 264/54
(58) Field of Classification Search ................ 206/584; 210/602; 264/54
See application file for complete search history.

(56) References Cited

U.S. PATENT DOCUMENTS

| | | | |
|---|---|---|---|
| 2,649,958 A | * | 8/1953 | Rausch ....................... 206/584 |
| 3,890,844 A | | 6/1975 | Gale ......................... 73/421 R |
| 4,333,263 A | | 6/1982 | Adey ........................... 47/1.4 |
| 4,342,650 A | | 8/1982 | Erickson et al. ............ 210/606 |
| 4,502,918 A | | 3/1985 | Mackie et al. ................ 162/24 |
| 4,846,870 A | | 7/1989 | Weltzien et al. ............... 71/24 |
| 4,966,096 A | | 10/1990 | Adey ............................ 119/3 |
| 5,036,900 A | | 8/1991 | Burley et al. ................. 162/9 |
| 5,097,795 A | | 3/1992 | Adey ............................ 119/3 |
| 5,131,820 A | | 7/1992 | Jensen ........................ 417/415 |
| 5,186,990 A | | 2/1993 | Starcevich ................. 428/35.6 |

(Continued)

FOREIGN PATENT DOCUMENTS

EP 0 488 486 A1 6/1992

*Primary Examiner*—Chester T. Barry
(74) *Attorney, Agent, or Firm*—Kilpatrick Stockton LLP

(57) ABSTRACT

An integrated system and method for removing excess nutrients from water, for removing the nutrients from the removal site, for enhancing soil, and for producing pulp and paper products includes bioremediating water to be treated with cultured algae or another suitable plant matter in an attached periphyton bed, harvesting the algae/plant matter to produce a wet algal biomass, and mixing the wet biomass with a shredded fibrous material to produce a pulp. The pulp can be molded into a biodegradable package that can be utilized as a delivery vehicle to a site having nutrient-enrichable soil, where the package can be used as a soil amendment after being used as a delivery vehicle. The pulp can also be made into a paper product that is biodegradable and has the characteristic of enhancing soil quality.

1 Claim, 1 Drawing Sheet

U.S. PATENT DOCUMENTS

| | | | |
|---|---|---|---|
| 5,254,252 A | 10/1993 | Drenner | 210/602 |
| 5,277,758 A | 1/1994 | Brooks et al. | 162/4 |
| 5,360,586 A * | 11/1994 | Wyatt et al. | 264/54 |
| 5,364,451 A | 11/1994 | Raskin et al. | 75/710 |
| 5,424,026 A | 6/1995 | Tohbo et al. | 264/517 |
| 5,500,086 A | 3/1996 | Sakai et al. | 162/65 |
| 5,516,580 A * | 5/1996 | Frenette et al. | 442/153 |
| 5,527,456 A | 6/1996 | Jensen | 210/170 |
| 5,567,275 A | 10/1996 | Nicolucci et al. | 162/99 |
| 5,573,669 A | 11/1996 | Jensen | 210/602 |
| 5,591,341 A | 1/1997 | Jensen | 210/602 |
| 5,676,727 A | 10/1997 | Radlein et al. | 71/12 |
| 5,733,453 A | 3/1998 | DeBusk | 210/602 |
| 5,766,476 A | 6/1998 | Valkanas et al. | 210/605 |
| 5,779,960 A | 7/1998 | Berlowitz-Tarrant et al. | 264/176.1 |
| 5,894,040 A | 4/1999 | Foley et al. | 428/34.2 |
| 5,900,119 A * | 5/1999 | Goers et al. | 162/218 |
| 5,985,147 A | 11/1999 | Jensen et al. | 210/602 |
| 5,993,649 A | 11/1999 | DeBusk et al. | 210/97 |

\* cited by examiner

PLANT MATTER PACKAGING METHOD

CROSS-REFERENCE TO RELATED APPLICATIONS

This application is a divisional application of application Ser. No. 10/392,185, filed Mar. 20, 2003, which is a continuation of application Ser. No. 10/243,935, filed Sep. 16, 2002 (now U.S. Pat. No. 6,554,960), which is a continuation of application Ser. No. 10/038,820, filed Jan. 8, 2002 (now U.S. Pat. No. 6,551,463), which is a continuation of application Ser. No. 09/378,987, filed Aug. 23, 1999 (now U.S. Pat. No. 6,350,350), which is a continuation-in-part of application Ser. No. 09/211,423, filed Dec. 15, 1998 (now U.S. Pat. No. 5,985,147) which is a continuation of application Ser. No. 08/831,736, filed Apr. 1, 1997 (now abandoned).

BACKGROUND OF THE INVENTION

1. Field of the Invention

The present invention relates to methods for improving water and soil and to ecologically beneficial bioremediation, manufacturing, and recycling methods. The invention further relates, more particularly, to ecologically beneficial methods for making pulp and paper products.

2. Description of Related Art

Bioremediation of wastewater from, for example, wetlands or municipal effluent has been successfully accomplished with the use of species of plants that remove excess nutrients. Wetland filtration is one such method of bioremediation, but it requires relatively large land areas to accomplish wastewater cleanup. In addition, the nutrients are generally left in situ and can under some circumstances be rereleased into the environment, such as in a dry-year fire or through succession.

Other methods use attached algal colonies known as periphyton, which utilize biological pathways to remove and degrade a wide spectrum of pollutants, such as excess phosphorus, nitrogen, carbon, alkaline earth metals, and heavy metals (Adey, U.S. Pat. No. 4,333,263; Jensen, U.S. Pat. Nos. 5,131,820, 5,527,456, 5,573,669, and 5,591,341, the disclosures of which are incorporated herein by reference). Periphyton filtration requires far less land area than wetland filtration and also retains the nutrients in a confined area from which the algae and ingested or sequestered nutrients may be harvested.

Periphyton filtration has been shown to remove a wide array of nutrients and other contaminants usually occurring at low levels when compared with municipal wastewater. The attached algae are known to grow at rates exceeding those of terrestrial plants, and a periphyton filtration system can generate large masses of algae that need to be disposed of after harvesting, typically by transportation from the bioremediation site to another area for introduction into the soil or to be used as livestock feed.

It is known to use the harvested algal biomass as a fertilizer (Snyder and Adey, unpublished, June, 1993) and in pulp production (Sakai et al., U.S. Pat. No. 5,500,086). It is also known to use pulp from recycled paper products to mold packaging and containers (Emery International Developments, Ltd., Toronto, Ontario, Canada, January, 1995).

SUMMARY OF THE INVENTION

It is therefore an object of the present invention to provide an integrated system and method for utilizing biomass harvested from a bioremediation process to produce recycled pulp and paper products.

It is another object to provide such a system and method to produce such a biodegradable product that can be further recycled for use as a soil additive.

It is a further object to provide such a system and method that links an enhanced biological filtration technique, manufacturing technology, and a packaging product to export nutrients from a bioremediation site.

A first embodiment of the method of the present invention is for producing pulp for use in making a packaging material. The method comprises the steps of culturing plant matter in a bed and running water to be treated thereover. The plant matter should have the attribute of being able to absorb or sequester the material desired to be removed from the water. In a specific embodiment the plant matter comprises algae in an attached periphyton bed. The plant matter in the bed is permitted to absorb pollutants/nutrients from the water, which serves to bioremediate the water.

After the algae has had sufficient time to absorb and/or sequester the material/pollutants that are desired to be removed, and the bed has grown to a predetermined level, the algae are harvested, which removes the pollutants from the periphyton bed. The harvested algae produce a wet algal biomass, which is then mixed with a shredded paper product to produce a pulp.

The pulp can be used, for example, to make packaging, which is biodegradable in soil and, when added in an approximate range of 10-25% by volume, has been shown to improve dramatically the quality of the soil. In addition, the packaging itself can serve as a vehicle for removing the excess nutrients from the bioremediation site or basin, thereby increasing the ecological efficacy and benefits of the method.

In a second embodiment, another bioremediation plant, a combination of more than one of such plants, or a combination of one or more of such plants with algae is used as the biomass.

In a third embodiment, the first embodiment of the method and system as described above is extended to make a paper product from the pulp produced thereby.

The features that characterize the invention, both as to organization and method of operation, together with further objects and advantages thereof, will be better understood from the following description used in conjunction with the accompanying drawing. It is to be expressly understood that the drawing is for the purpose of illustration and description and is not intended as a definition of the limits of the invention. These and other objects attained, and advantages offered, by the present invention will become more fully apparent as the description that now follows is read in conjunction with the accompanying drawing.

BRIEF DESCRIPTION OF THE DRAWING

The FIGURE schematically illustrates a system for producing pulp from harvested biomass.

DETAILED DESCRIPTION OF THE PREFERRED EMBODIMENTS

Figure 1:
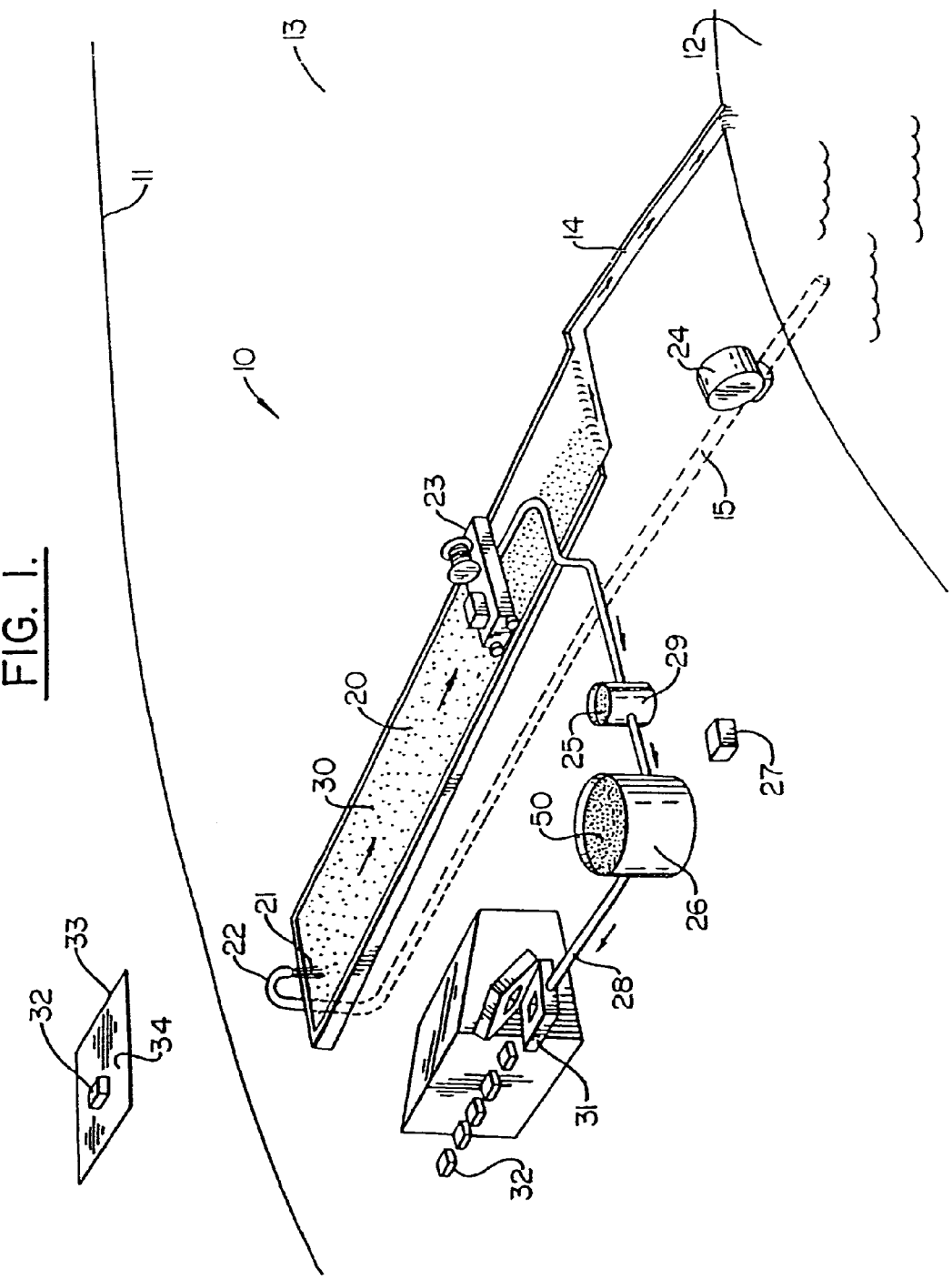

A description of the preferred embodiments of the present invention will now be presented with reference to the FIGURE.

A first embodiment of the invention comprises a method for producing pulp for use in making a packaging material. This method comprises the steps of culturing a desired plant matter in a bed and running water to be treated over the bed. As above, the plant matter should be able to absorb or otherwise sequester the material to be removed from the water. In a specific embodiment the plant matter comprises algae, and the bed comprises an attached periphyton bed. The water may be run continuously or retained for a specified time upon the bed, depending upon the level of remediation required/desired. While the water is in contact with the algae, pollutants and/or excess nutrients are absorbed which bioremediates the water.

In a particular embodiment, water within a basin 13, the edge 11 of which defines a watershed of the basin 13, is fed by gravity flow into a lake 12. This water to be treated 21 can then be pumped via pump 24 through water line 15 to the inlet 22 of the bed 20.

When desired, the algae are harvested, which removes the pollutants/nutrients from the periphyton bed. The harvest comprises a wet algal biomass, which can be partially dried to thicken it, and which can then be mixed with a shredded paper product such as to shredded recycled newsprint produce a pulp.

It should be appreciated by one skilled in the art that, either in addition to or instead of algal periphyton, other bioremediation plant(s) can be employed, including, but not limited to, water hyacinth (*Eichhornia crassipes*), dollar weed, water lettuce, and duckweed. Therefore, the term algae is not intended as a limitation on the present invention.

The system 10 for producing pulp 50 is illustrated in the FIGURE and comprises a plant matter support bed 20, such as an attached periphyton bed, for culturing plant matter 30 such as algae or another waste bioabsorber and an inlet 22 for admitting water to be treated 21 into the bed 20. A harvester 23 is adapted to remove the plant matter 30 and the absorbed pollutants/nutrients from the bed 20. The wet biomass 25 formed thereby is then dewatered in any device as is known in the art 29 and blended in a mixing vat 26 with a shredded paper or fibrous product 27 to produce a pulp 50.

A second embodiment of the invention comprises a method for producing a biodegradable package 32. This method comprises the steps as above in the first embodiment, with the addition that the pulp is molded into a package 32 that is biodegradable in soil and may be used to fertilize soil.

The system for producing a biodegradable package, also shown in the FIGURE, additionally comprises a mold 31 for molding the pulp 50 into a package 32.

A third embodiment of the present invention comprises an integrated method for removing excess nutrients from wastewater 21 and for removing the nutrients from the removal site. This method comprises the additional step of utilizing the package 32 as a delivery vehicle to a site 33 having nutrient-enrichable soil 34, where the package can be used as a soil amendment after being used as a delivery vehicle. The soil quality is improved by providing the absorbed nutrients, aiding water-retention capability, and increasing soil binding or tilth to reduce erosion and promote aeration.

A possible highly integrated embodiment of this method would entail locating a package-manufacturing facility in close proximity to the periphyton filtration system. The molded packages 32 could be used as delivery boxes for sending other articles to a second site 33 known to be in need of soil amendment. Such boxes could include, but are not intended to be limited to, pots for horticultural products, which could be planted into the soil directly without being removed from the delivery box, egg cartons, packaging filler sheets, loose fill ("peanuts"), packaging shock protection and positioning elements, and "cardboard" mailing boxes. This method has the added advantage of eliminating the need to dispose of the packaging in a landfill or by burning.

It may be appreciated by one skilled in the art that additional embodiments may be contemplated, including the use of other types of plant matter and fibrous material to manufacture the pulp.

In the foregoing description, certain terms have been used for brevity, clarity, and understanding, but no unnecessary limitations are to be implied therefrom beyond the requirements of the prior art, because such words are used for description purposes herein and are intended to be broadly construed. Moreover, the embodiments of the apparatus illustrated and described herein are by way of example, and the scope of the invention is not limited to the exact details of construction.

Having now described the invention, the construction, the operation and use of preferred embodiment thereof, and the advantageous new and useful results obtained thereby, the new and useful constructions, and reasonable mechanical equivalents thereof obvious to those skilled in the art, are set forth in the appended claims.

What is claimed is:

1. A packaging method comprising the steps of:
   providing harvested plant matter;
   mixing the harvested plant matter with a shredded material to product a pulp; and
   producing a package from the pulp;
   wherein the plant material is chosen from a group consisting of: water hyacinth, dollar weed, water lettuce, and duckweed.

* * * * *